Aug. 24, 1948.    C. D. BRANSON    2,447,560
TEMPERATURE REGULATOR
Filed June 29, 1945
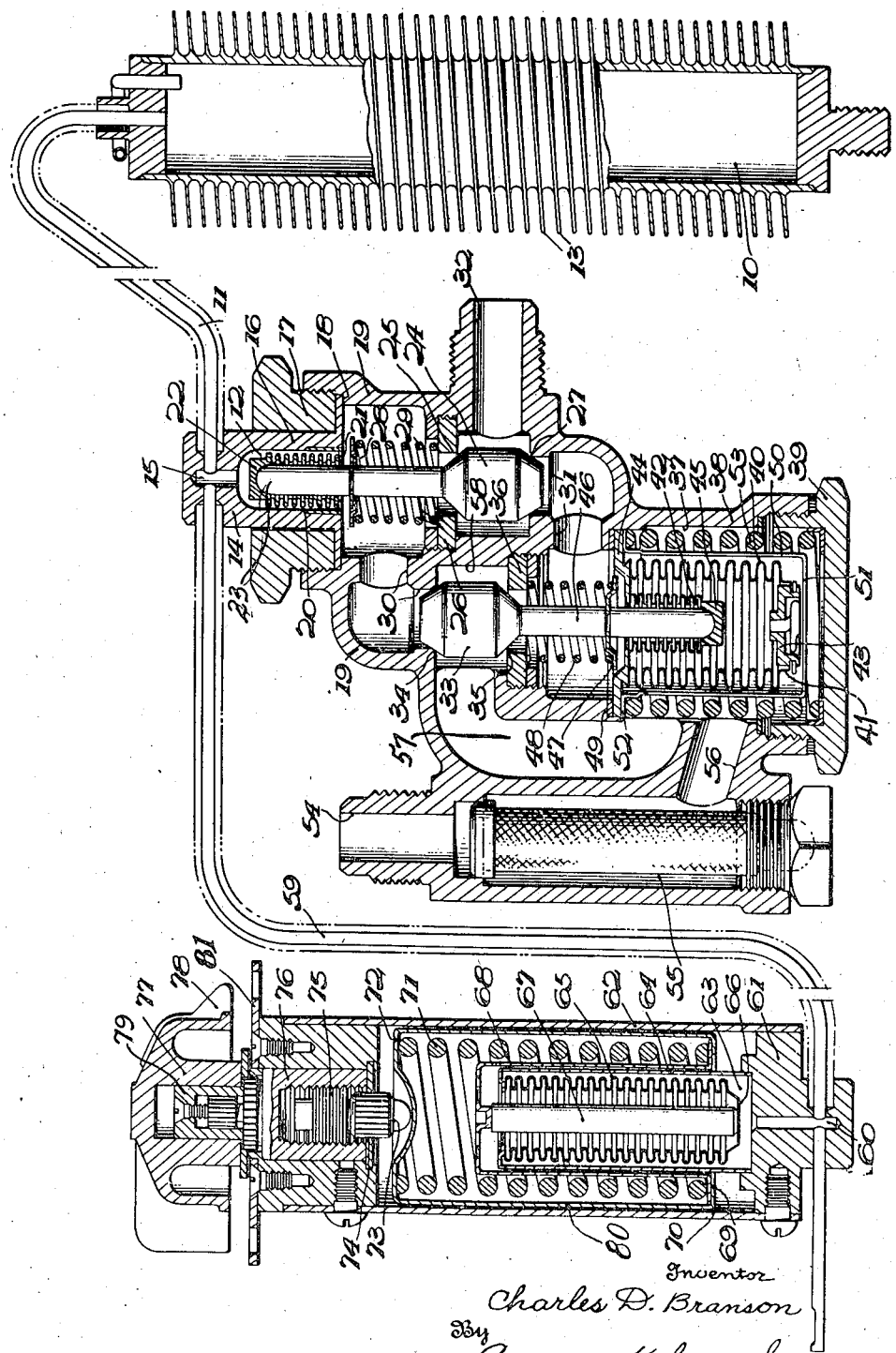
Inventor
Charles D. Branson
By
Cameron, Kerkam & Sutton
Attorneys Patented Aug. 24, 1948

2,447,560

UNITED STATES PATENT OFFICE 2,447,560

TEMPERATURE REGULATOR

Charles D. Branson, Knoxville, Tenn., assignor to Robertshaw-Fulton Controls Company, a corporation of Delaware Application June 29, 1945, Serial No. 602,225

7 Claims. (Cl. 236—1)

1

This invention relates to temperature regulators, and more particularly to a temperature regulator adapted automatically to control the flow of either a heating or a cooling fluid of the type disclosed in Giesler Patent No. 2,353,889, granted July 18, 1944, for Temperature regulators.

If a single thermostatically operated valve is to control the flow of either a heating fluid or a cooling fluid to maintain a desired temperature condition or range its operation in response to the thermostat must be reversed depending upon whether a heating fluid or a cooling fluid is being controlled, i. e., if the valve is operating to control heating fluid an increase in temperature above the temperature to be maintained requires that the valve be moved toward closed position to decrease the quantity of heating fluid being admitted to the heat exchanger, whereas if the valve is controlling a cooling fluid an increase in temperature above that which is to be maintained requires a movement of the valve toward open position to increase the amount of cooling fluid flowing to the heat exchanger.

Experience has demonstrated that if the thermostat for operating the valve that reverses the flow of operating fluid, and herein called the selector valve, is merely immersed in a well to which the operating fluid has access the operation of the selector valve may be undesirably sluggish in effecting the desired reversal of fluid flow when need therefor occurs. It is an object of the present invention to provide an improved regulator of the type referred to wherein the response of the selector valve is more sensitive than in structures heretofore proposed.

Another object of this invention is to provide an improved regulator of the type referred to wherein proper seating of the valve or valves is assured so as to prevent cocking under thermostatic operation and consequent leakage that may decrease or even upset the desired accuracy of controlled regulation on the part of either or both of the selector valve and the valve controlling the quantity of flow of the operating fluid.

Another object of this invention is to provide an improved regulator of the type referred to having a simplified and improved construction at the selector thermostat.

Another object of this invention is to provide an improved regulator of the type referred to having a simplified and improved construction of range selector mechanism.

Another object of this invention is to provide an improved regulator of the type referred to having improved overrun provisions.

2

Other objects will appear as the description of the invention proceeds.

The invention is capable of receiving a variety of mechanical expressions one of which is illustrated on the accompanying drawing, but it is to be expressly understood that the drawing is for purposes of illustration only, and is not to be construed as a definition of the limits of the invention, reference being had to the appended claims for that purpose.

The drawing shows in elevation and somewhat schematically an embodiment of the present invention, it being expressly understood that the relationship shown between the parts of the structure connected by tubing has been selected merely for convenience of illustration.

As shown, the embodiment of the present invention selected for explanation of the invention consists of two thermostatically operated valve mechanisms so related that one predetermines the direction of flow of the medium under control through the other, the latter determining the quantity of medium flowing to the heat exchanger and including a temperature responsive bulb, which may be disposed at any suitable distance and at any suitable location and relationship with respect to its valve mechanism, and means for adjusting the operation and response of said valve mechanism, which also may be located at any suitable distance and at any suitable location and relationship with respect to both said bulb and said valve mechanism.

In the embodiment illustrated the thermostatically operated valve mechanism for determining the quantity of medium flowing to the heat exchanger includes a bulb 10 connected through any suitable piping, such as a capillary tube 11, with an expansible and collapsible chamber or motor vessel 12. Bulb 10, tube 11 and vessel 12 are filled with any suitable thermosensitive medium, preferably though not necessarily a liquid. Bulb 10 may be of any suitable size, construction and material, being shown as provided with circumferentially extending ribs 13 so that it may be subjected to the ambient of a room or other compartment whose temperature is to be controlled and be sensitively responsive to variations in temperature thereat. Tube 11 is secured in any suitable way to one end of said bulb, and at its opposite end tube 11 is connected in any suitable way to a housing member 14 in communication with a passage 15 leading to said chamber 12. Housing member 14 has a tubular wall 16, and at its inner end it is appropriately flanged and retained by a nut 17 on a shoulder 18 provided in the casing 19. Chamber 12 has its outer wall formed by said tubular wall 16 and its inner wall formed by an expansible and collapsible corrugated tubular metal wall or bellows 20 having one end suitably secured to a flange 21 formed on or fixedly attached to wall 16 and its opposite end suitably secured to a movable end wall 22.

End wall 22 is engaged with the stem 23 of a double seating valve member 24 adapted to cooperate at one face with a ported seat 25, here shown as formed on a ring 26 suitably secured in the casing, and at its opposite face with a ported seat 27, here shown as formed on an inner wall of the casing. Stem 23 carries in any suitable way adjacent the end of the bellows 20 a spring seat 28 of any suitable construction, and reacting between said spring seat 28 and a suitable seat provided on the casing wall, as by the ring 26, is a coil spring 29 which not only holds the end of the stem 23 in continuous engagement with the movable wall 22 of the bellows 20 but also centers and prevents tilting of the stem 23 so that accurate seating of the valve member 24 on its seats 25 and 27 is assured to prevent the leakage that would occur if the valve member cocked in seating.

Casing 19 is provided interiorly and in any suitable way with passages 30 and 31 leading to the valve seats 25 and 27 respectively and adapted to be placed in communication through the valve ports with an outlet passage 32 leading to any suitable heat exchanger disposed at any suitable distance and location and relationship with respect to the casing 19.

The determination as to whether the medium under control shall flow through the passages 30 or 31 is effected by a second thermostatically controlled selector valve mechanism including a double seating valve member 33 cooperating with opposed ported valve seats 34 and 35, the former being shown as formed on an inner wall of the casing 19 and the latter being shown as formed on a ring 36 secured in the casing 19 in any suitable way. The port in seat 34 is in communication with the passages 30, and the port in seat 35 is in communication with the passages 31.

The thermostat for operating said valve member 33 is mounted in a chamber 37 formed in a tubular extension 38 of the casing 19 and shown as closed by a closure member 39. Said thermostat 40 comprises an outer corrugated tubular metal wall or bellows 41 of relatively stiff construction, but yieldable to expand and contract under conditions hereinafter explained, and an inner expansible and collapsible corrugated tubular metal wall or bellows 42 which is more easily flexed than bellows 41. Bellows 41 has one extremity suitably attached to a head 43 and its opposite end suitably attached to an annular flanged member 44. Bellows 42 has one end suitably attached to the inner periphery of said member 44 and its opposite end suitably attached to an end member 45 which engages the stem 46 of valve member 33. Stem 46 carries in any suitable way adjacent the end of bellows 42 a spring seat 47 of any suitable construction, and reacting between said spring seat 47 and a suitable seat formed on the casing wall, as by the ring 36, is a coil spring 48 which holds the end of the stem 46 in engagement with member 45 and also prevents cocking of the valve member 33 as above explained. Flanged member 44 is held against a seat 49, with or without intermediate packing, and the thermostat 40 is surrounded by a perforated tubular member 50 having a head 51 engaged by the head 43 on bellows 41 for a purpose to be explained. A flange 52 on member 50 is normally held against member 44 by a coil spring 53 reacting between said flange and the closure member 39. The chamber between the bellows 41 and 42 is the thermostat chamber and is charged with a suitable thermosensitive fluid, preferably though not necessarily a liquid. The operating fluid controlled by the thermostat is caused to flow into intimate contact with the thermostat 40, and to this end the inlet conduit 54 communicates, preferably through a screen 55, with a passage 56 leading to the chamber 37 at or adjacent one end thereof, said fluid leaving said chamber through a passage 57 communicating with chamber 37 at or adjacent the opposite end thereof. Passage 57 leads to the chamber 58 in which the valve member 33 is disposed to cooperate with the ports 34 and 35.

The first described thermostatically operated valve 24 is preferably provided with adjustable means to predetermine the range of temperature to be maintained thereby and which means may also contain provisions for preventing injury to the parts in the event that the thermostat of valve 24 continues to expand after said valve becomes seated. As shown, the passage 15 in housing member 14 communicates through a suitable passage, as the capillary tube 59, with a passage 60 in a block 61 suitably attached to the housing 62 of a range selector mechanism which may be disposed at any suitable distance from and in any suitable location and relationship to the casing 19. Passage 60 communicates with a chamber 63 defined by a tubular member 64 suitably attached to said block and an expansible and collapsible corrugated metal wall or bellows 65 having one end suitably attached to member 64 and its opposite end closed by an end wall 66. Interiorly of bellows 65 is a post 67 in engagement with said end wall 66 and mounted on an outer tubular member 68. At its opposite end, member 68 is outwardly flanged at 69 for engagement with the inwardly directed flange 70 of a third tubular member 80 surrounding members 64 and 68. A coil spring 71 reacts between the flange 69 and the closed end 72 of member 80 to hold flanges 69 and 70 normally in engagement. End wall 72 is engaged by an axially movable post 73 suitably held against rotation at 74 but threadedly engaged at 75 with the inwardly extending shank 76 having an extension 79 secured thereto in any suitable way and received in the bore of a rotatable control knob 77, so that rotatable movement of said knob effects axial movement of post 73. Knob 77 may have a pointer 78 cooperating with any suitable indicia on plate 81.

In operation, and assuming that the bulb 10 is suitably mounted so as to be responsive to variations in temperature in the room or other compartment in which the temperature is to be controlled, and further assuming that a source of heating medium has been put in communication with the inlet passage 54, said heating medium may flow through said inlet passage and filter 55 to passage 56 where it enters the chamber 37 containing thermostat 40, free access to the outer wall 41 of said thermostat being had through the perforations in tubular member 50. From the opposite end of said chamber 37 the heating medium flows through passage 57 to the chamber 58 containing the valve member 33. The heating medium in chamber 37 maintains the thermostat 40 in its relatively expanded condition holding valve member 33 against its seat 34 and preventing flow of the medium through the passages 30 to valve seat 25 but permitting flow through port 35 to passages 31 and port 27. Valve member 24 as shown is in contact with its seat 27, preventing flow of the heating medium to the outlet passage 32 and thence to the heat exchanger, which is the position assumed by the parts when the temperature in the room or other compartment has reached the maximum desired temperature. If the temperature in said room or other compartment decreases the liquid in bulb 10 responds to the decreasing temperature and by contraction permits contraction of the expansible and collapsible chamber 12. Valve member 24 is thereby moved from its seat 27 by the spring 29 so that heating medium may flow past the seat 27 to the outlet 32. Valve 24 will move away from its seat 27 until the quantity of heating medium supplied to the heat exchanger establishes the desired temperature. If the temperature increases the liquid in bulb 10 expands and expands chamber 12 to move valve member 24 back toward its seat 27, ultimately engaging said seat and discontinuing the flow of heating medium if the maximum desired temperature is again reached. It will be noted that the valve member 24 in this relationship of the parts moves toward its seat 27 to decrease heating medium flow as the temperature rises, and moves away from the seat to increase heating medium flow as the temperature decreases, as is proper for the control of a heating medium.

Now assume that the inlet passage 54 is placed in communication with a source of cooling medium. The cooling medium flowing through the chamber 37 causes a contraction of the thermostat 40, moving the valve member 33 into contact with its seat 35 and opening the port of valve seat 34 leading to passages 30 and valve seat 25. Under these conditions the valve member 24, in its position as shown in the drawing, would permit maximum flow of the cooling medium past seat 25 to the outlet passage 32. As the temperature in the room or compartment containing the bulb 10 decreases the liquid in bulb 10 contracts, effecting a contraction of chamber 12 and thereby moving valve member 24 toward its seat 25 to decrease the flow of cooling medium until the valve member assumes that position at which the desired temperature is maintained. If the temperature in the room or other compartment continues to decrease, valve member 24 will ultimately engage seat 25 and cut off the flow of cooling medium. If the temperature in the room or other compartment rises, the liquid in bulb 10 expands, expanding chamber 12 and moving valve member 24 off its seat 25. In this relationship of the parts it will be observed that the valve member 24 is moved away from its seat 25 to increase the flow of cooling medium upon increase in temperature at the bulb 10, and is moved toward its seat to decrease the flow of cooling medium on decrease of temperature at the bulb 10, as is proper when the thermostatically operated valve is controlling the flow of a cooling medium.

The range of temperature to be maintained may be nicely predetermined by operation of the knob 77, the rotation of which in one direction or the other produces axial movement of post 73 in one direction or the other. Assuming downward movement of post 73 as viewed in the drawing, tubular member 80 is moved downwardly, and as flanges 69 and 70 are held together as a unit by spring 71, member 68 is moved downwardly to cause post 67 to expand bellows 65. Thereby the fluid in chamber 63 is forced through tube 59 and passage 15 into the chamber 12 to move valve member 24 away from its seat 25 and toward its seat 27. Thereby flow through port 27 is discontinued at a lower temperature when heating medium is under control or flow through the port 25 is discontinued at a lower temperature when cooling medium is under control. Expansion of chamber 63 by a reverse movement of post 73 will obviously produce reverse effects at valve member 24.

If the liquid in bulb 10 should continue to expand after valve member 24 has engaged its seat 27, the expanding fluid may flow into chamber 63 to expand the same by contracting bellows 65. The movable end wall 66 of said bellows, acting through post 67, can now move tubular member 68, lifting its flange 69 off of flange 70 against the tension of spring 71. As soon as the force producing this overrun is removed, spring 71 restores the parts to their relationship for normal operation.

The bellows 41 constituting the outer wall of thermostat 40 is less flexible than the bellows 42 constituting its inner wall as before pointed out. Hence under normal conditions of operation, wherein said thermostat is sensitively responsive to the temperature of the operating medium flowing into direct contact with its outer wall and over a major extent thereof in an axial direction, expansion of the fluid in the chamber interiorly of bellows 41 produces contraction of bellows 42 and movement of valve member 33 upwardly as viewed in the drawing. If the fluid in the thermostat 40 continues to expand after valve member 33 engages its seat 34, however, bellows 41 may expand downwardly, moving end wall 51 of tubular member 50 downwardly against the tension of the spring 53. When the force producing this overrun is removed the spring 53 restores the parts to their position for normal operation.

It will therefore be perceived that by the present invention an improved temperature regulator has been provided whereby the valve mechanism for predetermining the flow of either a heating or a cooling medium may be properly conditioned so as to move in proper direction with respect to its seat depending upon which medium is to be controlled, and this is effected automatically when the medium is introduced into the system. The valve mechanism so provided varies its position progressively to adjust the flow to maintain the desired temperature without the disadvantages incident to a valve operation wherein the valve moves from wide open to fully closed position, or vice versa. Moreover means have been provided whereby the temperature to be maintained may be nicely predetermined by readily operable adjusting mechanism. The regulator furthermore assures that increase in temperature after a valve member has engaged its seat shall not be productive of destructive pressures within the regulator. The regulator is also so constructed that cocking of the valve members and consequent leakage is effectively prevented. The regulator is relatively simple in construction, easy to install and adjust, inexpensive to produce, and highly efficient in operation.

While the embodiment of the invention illustrated on the drawing has been described with considerable particularity it is to be expressly understood that the invention is not restricted thereto, as the same may take a variety of mechanical expressions, some of which will now readily suggest themselves to those skilled in the art, while changes may be made in the details of construction, arrangement and proportion of parts, and certain features used without other features, without departing from the spirit of the invention. Reference is therefore to be had to the appended claims for a definition of the invention.

What is claimed is:

1. In a temperature regulator for controlling the flow of either a cooling medium or a heating medium to a heat exchanger, in combination with a casing, a valve member therein, means in said casing providing a pair of valve ports with which said member is adapted to cooperate and a thermostat subjected to the temperature to be controlled and operatively connected to said valve member, said casing having passages leading to the respective valve ports, a valve in said casing for predetermining whether the medium to be controlled shall flow through one or the other of said passages, a thermostat operatively connected to said last named valve, said casing including means providing a chamber in which said last named thermostat is disposed, and said casing having passages for conveying the medium to be controlled into and out of said chamber on its way to said last named valve.

2. In a temperature regulator for controlling the flow of either a cooling medium or a heating medium to a heat exchanger, in combination with a casing, a valve member therein, means in said casing providing a pair of valve ports with which said member is adapted to cooperate and a thermostat subjected to the temperature to be controlled and operatively connected to said valve member, said casing having passages leading to the respective valve ports, a valve in said casing for predetermining whether the medium to be controlled shall flow through one or the other of said passages, a thermostat operatively connected to said last named valve, said casing including means providing a chamber in which said last named thermostat is disposed, said casing having an inlet passage for the medium to be controlled in communication with said chamber adjacent one end thereof and a passage leading to said last named valve and in communication with said chamber adjacent the opposite end thereof.

3. In a temperature regulator for controlling the flow of either a cooling medium or a heating medium to a heat exchanger, in combination with a casing, a valve member therein, means in said casing providing a pair of valve ports with which said member is adapted to cooperate and a thermostat subjected to the temperature to be controlled and operatively connected to said valve member, said casing having passages leading to the respective valve ports, a valve for predetermining whether the medium to be controlled shall flow through one or the other of said passages, a thermostat operatively connected to said last named valve, said casing including means providing a chamber in which said last named thermostat is disposed and said casing having passages for conveying said medium to and from said chamber, said last named thermostat including an inner expansible and collapsible corrugated tubular wall connected to said last named valve and an outer expansible and collapsible corrugated tubular wall which is less flexible than said inner wall but yieldable when flexure of said inner wall is prevented by seating of said valve.

4. In a temperature regulator for controlling the flow of either a cooling medium or a heating medium to a heat exchanger, in combination with a casing, a valve member therein, means in said casing providing a pair of valve ports with which said member is adapted to cooperate and a thermostat subjected to the temperature to be controlled and operatively connected to said valve member, said casing having passages leading to the respective valve ports, a valve for predetermining whether the medium to be controlled shall flow through one or the other of said passages, a thermostat operatively connected to said last named valve, said casing including means providing a chamber in which said last named thermostat is disposed and said casing having passages for conveying said medium to and from said chamber, said last named thermostat including an inner expansible and collapsible corrugated tubular wall connected to said last named valve and an outer expansible and collapsible corrugated tubular wall which is less flexible than said inner wall but yieldable when flexure of said inner wall is prevented by seating of said valve, a member moved by the expansion of said outer wall, an abutment, and a spring for holding said last named member against its abutment but yieldable when said member is moved by the expansion of said outer wall.

5. In a temperature regulator for controlling the flow of either a cooling medium or a heating medium to a heat exchanger, in combination with a casing, a valve member therein, means in said casing providing a pair of valve ports with which said member is adapted to cooperate and a thermostat subjected to the temperature to be controlled and operatively connected to said valve member, said casing having passages leading to the respective valve ports, a valve for predetermining whether the medium to be controlled shall flow through one or the other of said passages, a thermostat operatively connected to said last named valve, said casing including means providing in which said last named thermostat is disposed and said casing having passages for conveying said medium to and from said chamber, and range adjusting mechanism for said first named thermostat including an expansible and collapsible chamber in communication therewith, a pair of tubular telescopically arranged members provided with normally contacting surfaces, a spring reacting between said members and normally holding said surfaces in engagement whereby said members normally move as a unit but yieldable to permit relative movement between said members, a post on one of said members engaging a movable wall of said last named chamber, and manual means for moving the other of said members to adjust the volume of said chamber through the coaction of said post therewith.

6. In a temperature regulator for controlling the flow of either a cooling medium or a heating medium to a heat exchanger, in combination with a casing, a valve member therein, means in said casing providing a pair of valve ports with which said member is adapted to cooperate and a thermostat subjected to the temperature to be controlled and operatively connected to said valve member by a valve stem, means for normally urging said valve member toward one of said ports including a spring seat carried by said valve stem adjacent said thermostat, a coil spring surrounding said stem and reacting between said spring seat and a surface adjacent one of said ports, said casing providing passages leading to the respective valve ports, a valve for predetermining whether the medium to be controlled shall flow through one or the other of said passages, a thermostat operatively connected to said last named valve, said casing including means providing a chamber in which said last named thermostat is disposed, and said casing having passages for conveying the medium to be controlled into and out of said chamber on its way to said last named valve.

7. In a temperature regulator for controlling the flow of either a cooling medium or a heating medium to a heat exchanger, in combination with a casing, a valve member therein, means in said casing providing a pair of valve ports with which said member is adapted to cooperate and a thermostat subjected to the temperature to be controlled and operatively connected to said valve member, said casing having passages leading to the respective valve ports, a valve for predetermining whether the medium to be controlled shall flow through one or the other of said passages, a thermostat for controlling said last named valve, a valve stem connecting said valve and last named thermostat, a spring seat on said stem adjacent said thermostat, a coil spring surrounding said stem and reacting between said spring seat and a surface adjacent said valve, said casing including means providing a chamber in which said last named thermostat is disposed, and said casing having passages for conveying the medium to be controlled into and out of said chamber on its way to said last named valve.

CHARLES D. BRANSON.

REFERENCES CITED

The following references are of record in the file of this patent:

UNITED STATES PATENTS

| Number | Name | Date |
|---|---|---|
| Re. 22,685 | Carrier | Oct. 30, 1945 |
| 2,353,889 | Giesler | July 18, 1944 |